United States Patent
Foster et al.

(10) Patent No.: US 12,125,409 B2
(45) Date of Patent: *Oct. 22, 2024

(54) SYSTEMS AND METHODS FOR DYNAMIC MONITORING OF TEST TAKING

(71) Applicant: Caveon, LLC, Midvale, UT (US)

(72) Inventors: David Foster, Mount Pleasant, UT (US); Steve Addicott, Alphine, UT (US)

(73) Assignee: Caveon, LLC, Midvale, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/123,412

(22) Filed: Mar. 20, 2023

(65) Prior Publication Data

US 2023/0222934 A1    Jul. 13, 2023

Related U.S. Application Data

(63) Continuation of application No. 17/156,897, filed on Jan. 25, 2021, now Pat. No. 11,636,773, which is a continuation of application No. 16/390,294, filed on Apr. 22, 2019, now abandoned.

(60) Provisional application No. 63/322,347, filed on Mar. 22, 2022, provisional application No. 62/660,563, filed on Apr. 20, 2018.

(51) Int. Cl.
| | |
|---|---|
| G09B 7/00 | (2006.01) |
| G06Q 10/0631 | (2023.01) |
| G06Q 50/20 | (2012.01) |
| G06V 20/52 | (2022.01) |
| G06V 40/20 | (2022.01) |

(52) U.S. Cl.
CPC .......... *G09B 7/00* (2013.01); *G06Q 10/06315* (2013.01); *G06Q 50/205* (2013.01); *G06V 20/52* (2022.01); *G06V 40/20* (2022.01)

(58) Field of Classification Search
CPC ......... G09B 7/00; G06Q 50/20; G06Q 50/205
See application file for complete search history.

(56) References Cited

U.S. PATENT DOCUMENTS

| | | | |
|---|---|---|---|
| 9,881,516 B1 * | 1/2018 | Roth | H04L 67/02 |
| 2011/0171622 A1 * | 7/2011 | Lippert | G09B 7/00 |
| | | | 434/362 |
| 2011/0279228 A1 * | 11/2011 | Kumar | H04N 7/18 |
| | | | 340/5.83 |
| 2012/0042358 A1 * | 2/2012 | Kondur | G09B 7/02 |
| | | | 726/3 |

(Continued)

*Primary Examiner* — Peter R Egloff
(74) *Attorney, Agent, or Firm* — Stradley Ronon Stevens & Young LLP; Philip Foret; David Fitzgibbon

(57) ABSTRACT

A system and process for dynamic security monitoring of test taking. The system combines historical information about the test taker or relevant conditions, and includes sensors which objectively monitor test taker's actions, inactions, and involuntary response to the test given before and during the test, and at a specific test location. The information collected from the sensors is compared to a plurality of predetermined individual risk factors, which indicate a possibility of test fraud by the individual test taker to create a test event risk profile. The individual risk profile is combined with non-individual specific risk factors to create a holistic test event security profile. Security resources are then dynamically assigned to or removed from the test event based on the unique test event security profile.

17 Claims, 4 Drawing Sheets

(56) References Cited

U.S. PATENT DOCUMENTS

| | | | |
|---|---|---|---|
| 2014/0240507 A1* | 8/2014 | Hsu | H04N 7/185 |
| | | | 348/143 |
| 2016/0035233 A1* | 2/2016 | Breed | G06F 1/1656 |
| | | | 324/658 |
| 2017/0263141 A1* | 9/2017 | Possick | G09B 7/00 |
| 2017/0278417 A1* | 9/2017 | Ur | G09B 7/06 |

* cited by examiner

| video_results | second | input_recieved | Flag |
|---|---|---|---|
| No Inputs Recieved | 1 | None | No |
| Left Hand Keyboard, Right Hand Mouse | 2 | Mouse and Keyboard | No |
| Left Hand Keyboard, Right Hand Mouse | 3 | Mouse and Keyboard | No |
| No Hand Keyboard, Right Hand Mouse | 4 | Mouse and Keyboard | No |
| Left Hand Keyboard, Right Hand Mouse | 5 | Mouse and Keyboard | No |
| Left Hand Keyboard, Right Hand Mouse | 6 | Mouse and Keyboard | No |
| Left Hand Keyboard, Right Hand Mouse | 7 | Mouse and Keyboard | No |
| Left Hand Keyboard, Right Hand Mouse | 8 | Mouse and Keyboard | No |
| Left Hand Keyboard, Right Hand Mouse | 9 | Mouse and Keyboard | No |
| Left Hand Keyboard, Right Hand Mouse | 10 | Mouse and Keyboard | No |
| Left Hand Keyboard, Right Hand Mouse | 11 | Mouse and Keyboard | No |
| Left Hand Keyboard, Right Hand Mouse | 12 | Mouse and Keyboard | No |
| Left Hand Keyboard, Right Hand Mouse | 13 | Mouse and Keyboard | No |
| Both Hands Keyboard | 14 | Keyboard | No |
| Left Hand Keyboard, Right Hand Mouse | 15 | Mouse and Keyboard | No |
| Left Hand Keyboard, Right Hand Mouse | 16 | Mouse and Keyboard | No |
| Left Hand Keyboard, Right Hand Mouse | 17 | Mouse and Keyboard | Two Handed Typing |
| Left Hand Keyboard, Right Hand Mouse | 18 | Mouse and Keyboard | Two Handed Typing |
| Left Hand Keyboard, Right Hand Mouse | 19 | Mouse and Keyboard | Two Handed Typing |
| Left Hand Keyboard, Right Hand Mouse | 20 | Mouse and Keyboard | Two Handed Typing |
| Left Hand Keyboard, Right Hand Mouse | 21 | Mouse and Keyboard | Two Handed Typing |
| Left Hand Keyboard, Right Hand Mouse | 22 | Mouse and Keyboard | No |

FIG. 6

SYSTEMS AND METHODS FOR DYNAMIC MONITORING OF TEST TAKING

CROSS REFERENCE TO RELATED APPLICATION

This application is a continuation-in-part of U.S. patent application Ser. No. 16/390,294, titled "Systems and Methods for Dynamic Monitoring of Test Taking," filed on Apr. 22, 2019, which itself claims priority to U.S. Provisional Patent Application Ser. No. 62/660,563, titled "Systems and Methods for Dynamic Monitoring of Test Taking," filed on Apr. 20, 2018, the entireties of which are incorporated herein by reference. This application further claims the priority and benefit of U.S. Provisional Application Ser. No. 63/322,347, titled "Systems And Methods For Dynamic Identification Of Security Threats Based On A Test Taker's Movements While A Remote Test Is In Progress" filed on Mar. 22, 2022, the contents of which are incorporated by reference in its entirety in this application.

FIELD OF THE INVENTION

The present disclosure relates to a system and device to verify identity, verify presence, and verify compliance with rules of behavior in a test session or a remote test session. For example, aspects of embodiments of the present invention relate to the field of computer vision and including systems and methods configured to automatically and accurately: identify, confirm, and track the movement of test takers when a remote test is being administered to confirm that the responses being entered are those of the test-taker present and not a remote proxy.

BACKGROUND

Today, high-stakes or low-stakes test are delivered, presented or administered to test takers, whether students, prospective students, workers or prospective workers, usually using computers (laptops, desktops, tablets, smartphones, and others). Some tests, however, are still administered by paper and pencil. This invention would apply to those tests as well, but, due to its dynamic nature, the invention is better suited for administering computerized exams. This invention applies to all tests, however designed, created, administered or used.

The dominant requirement of such testing, particularly high-stakes tests (e.g., MCATs, SATs, college course exams, certification exams, employment and pre-employment tests, personality tests, and others), is to make sure there is enough security in place so that the risk associated with test fraud—cheating and test theft—is greatly reduced. If such test fraud is allowed, then the test scores cannot be used for the purposes designed (e.g., certification of skills, academic achievement, academic potential, etc.). Security can take many forms, but the one used ubiquitously is proctoring, or monitoring of test takers during a test session. The purpose of such monitoring is to detect cheating and/or test theft, or to deter such behavior. However, other security measures are possible. For example, the design of items and tests can reduce exposure and increase unpredictability so that test takers will be less motivated to harvest or steal content, or to use such information to cheat. Other security measures are used to deter test takers from such fraud by informing them of security rules and punishments, and by having them sign non-disclosure agreements, oaths or honor codes.

A test event is defined as a test taker taking or sitting for a test. One established fact about the current test administration process is that proctoring or monitoring security procedures are applied to all test events more or less equally. Test administration rules are usually clear as to the number of human monitors to be used based on the number of test takers in the room. This applies to testing centers and other locations (for example, gymnasiums for Saturday SAT testing) and to online monitoring. No effort is ever made to evaluate the risk of a specific test event, meaning the risk individual test takers and their circumstances pose to test security. This is because, before and during test administration, no data about the test event (including information about the tests, locations, test takers, testing history, new threats, and many more) is gathered or used. Heightened security procedures, designed for the group of test takers, are used almost by default and are universally deployed for all types of test events. Another way to state this is all test takers are monitored the same way whether individual test takers commit or intend to commit, or are even able to commit different types of test fraud (cheating or test theft). It is clear that such gross and universal security deployment is more expensive than it should be and is not the best allocation of resources.

Security is expensive, usually involving the labor of humans, as previously mentioned. Proctors are humans tasked with: (1) monitoring test takers during test administration, and (2) also authenticating each test taker to make sure he or she is the person who is supposed to take the test. For the latter, official ID's are checked, or some other biometric may be used. It is accepted that the cost of proctoring is the major expense of virtually all test administrations. Test administration costs (not pricing or fees for a test) per test event typically range from $20 to $50 depending on several factors (e.g., proctor wages, number of simultaneous test events, the cost of location, etc.). Personal cost factors such as the time/cost for test taker travel, parking costs, etc., are not considered in these estimates, they are add-on costs. Pricing for such tests is then applied providing a margin covering costs for the development of the tests, sales and marketing, profit, and other incidentals. Test administration is considered to be expensive today, and human-based security efforts are a large part of that expense.

If the labor costs of proctors can be reduced, then test administration becomes more affordable to all and accessible to those currently unable to afford tests. If the costs can be reduced while at the same time increasing the effectiveness of test security, then tests can be administered in homes, workplaces, and in countries where test security risks are currently too high or where test administration costs are too prohibitive. With such flexibility in testing locations, personal costs of travel time/cost, parking, etc., will be reduced as well.

Currently, test administration models have at least four significant and recognized security flaws.

First, current test administration models, whether physical or online, rely heavily on engaged human proctors. The number of test takers that a proctor may reasonably oversee is limited. As a result, such proctoring may unnecessarily inflate the cost and pricing of the test event as the proctors are used to oversee a large number of test takers, many or most of which have no intention of cheating or stealing the test content. For that likely majority, the cost of human proctors is completely wasted, and unnecessary for security or other reasons. Furthermore, as the proctors are human, they may be: (1) susceptible to bribery and conflicts of interest, (2) disinclined to monitor closely or well, (3) may shy away from confronting a person when fraud is actually observed, or (4) may have discriminatory biases towards one race, sex, gender, nationality, etc.

Second, test administration is unreasonably tied to set locations, such as an established testing center, a school classroom, or gymnasium. These testing locations are often themselves a source of security problems, as they do not support objective, un-biased monitoring. Indeed, proctors are rarely able to reasonably observe all the test takers all the time. Additionally, for some disabled test takers, anchoring the test to a single location may add an unreasonable burden (e.g., the location may not be ADA accessible). In addition, test takers who live in remote locations may not be able to travel to a designated testing center. Citizens of some countries cannot afford test administration fees of current systems let alone travel and parking expenses. Indeed, a test administration services vendor, in order to make a profit, especially in a difficult-to-service country, may have to charge as much as double or triple the retail price of a test. However, in those countries, often third-world countries, the most that a test taker may be able to afford would be a small fraction of the test price. Such financial pressures make it difficult to currently provide the highest quality security offered today in the United States worldwide.

Third, technology used for cheating is becoming harder to detect by human observation. For example, the new technology behind hideable, wearable, high-resolution, so-called "spy" cameras, makes it difficult, even impossible for a proctor to prevent or even detect the accurate theft of any test's entire content. Likewise, wireless earpieces permitting the test taker to communicate with a third party outside the testing center continue to shrink to the point that the presence of such ear pieces could only be identified with the assistance of visually-enhanced images and invasive searches.

Fourth, the massive migration to online, remote-proctored exams has created a new threat to test score validity by allowing a test taker to hire a confederate, or proxy, who actually completes the exam on the "authorized," (or registered) test taker's behalf when the test taker appears to be sitting for the exam. These proxies gain access to the test system through any number of software (virtual machine, etc.) or hardware (dually wired computers, etc.) configurations in a manner that is usually undetectable to the remote proctor. Since the COVID-19 epidemic, the prevalence of this mode of cheating has grown exponentially, as networks of proxies develop lucrative revenue streams taking tests for others. The result of this fraud is problematic in many ways: Investments in developing important exams are eroded; unqualified candidates gain opportunities they haven't earned, test program reputations are tarnished, and important, life-changing test scores simply cannot be trusted.

The description of the prior art provided in this disclosure highlights the unmet needs for a test monitoring system and method that: (a) evaluates the amount and type of security risk for individual test events; (b) allows the monitoring to be targeted, competent, remote and objective; (c) is flexible so as to permit the test event to occur in additional hard-to-reach and hard-to-service remote locations; (d) includes additional capability to assist in detecting and preventing the use of technology to cheat or steal test content; (e) is affordable for all; and (f) employs an artificial intelligence (AI)-enabled computer vision system that learns to recognize and flag potential test security issues in real time during a test event with high precision.

SUMMARY

The invention provides solutions to meet the needs in the industry for test monitoring systems and methods. Generally, the solutions include, but are not limited to, the following benefits: (i) the ability to take a variety of factors before and during an exam, and use the factors to calculate initial risk, continuously evaluate risk in real-time, and then act on that risk in real-time (ii) the use of cloud-based computer system(s) to send and receive risk-related information continuously in real time; (iii) implementation of statistically-based risk analytics, or any formal risk analytics; (iv) the ability to dynamically allocate security resources, depending on a current risk analysis level; (v) validate security of an exam event following conclusion of the test; (vi) use item and test design features as factors to modify the risk analysis; and (vii) an artificial intelligence (AI)-enabled computer vision system learns to recognize and flag potential test security issues in real time during a test event with high precision. These and other solutions are provided by the invention.

Illustrative and alternative embodiments of a computer-based test monitoring platform are described in detail with reference made to the figures of this application. The platform is configured to evaluate test security risk and to provide a competent, efficient, and secure monitoring system. The system includes additional detection and prevention tools to assist in monitoring or proctoring, as well as to identify and prevent cheating and theft. The platform is adaptable so that a test can be administered through a telecommunications network to a computer in a remote location.

In an exemplary, non-limiting embodiment, the system of the invention comprises a computer processor, at least one storage device configured to store collected data and to recall the stored data, one or more sensors configured to monitor specific risks, a risk analysis and management tool, an applicant file, and a location file. The system is configured to permit a test taker to sign into his/her account using unique identifying credentials, which provide access to the system so that the system can electronically administer a test that the test taker will be taking. The system can include at least one authentication sensor used to verify the identity of the test taker before and during test administration. The system is configured for risk analysis management to determine the test-taker's security profile for the initial level of monitoring, which can include proctors and automated sensors. Then, test administration begins. During the test, one or more sensors used for security detection continuously monitor the test taker and record the occurrence of any threats in the files of the system. All testing events are managed by the risk analysis tool that creates the test taker's unique security profile, evaluates known risks and indicates a security threat (e.g., cheating). The test-taker's security profile can change at any time during testing, depending on the specific threats detected. The test taker's security profile is continuously compared to threshold risk profiles stored in the system. Security resources are then allocated based on the comparison of the test-taker's security profile to the threshold risk profiles. In one non-limiting embodiment, when the test-taker's security profile risk is higher than the threshold risk profile, the test taker may be required to be instantly monitored one-on-one by a proctor. Conversely, if the test-taker's security profile is below the threshold risk profile, the test taker can be monitored by automated monitoring sensors or by human proctors who may also be monitoring other test takers.

The test-taker's security profile can be constructed from a plurality of events that occur during testing. For each characteristic of the test event captured by one or more sensors of the system, the processor calls up predetermined individual risk factors, previously uploaded by an owner or author of the test or an employee, contractor, or agent of the owner or author, and current security profile, to update the test-taker's security profile. The adjusted profile may indicate a higher risk of test fraud by the individual test taker. The processor then compares the adjusted profile of the individual to the security thresholds to determine if there is a match within a range of tolerance. This comparison can be noted in the applicant's file and/or the test file. The processor, at set intervals or continuously, uses the result of the comparison of the applicant's file to previously uploaded threshold levels to dynamically allocate changes in security directed towards the test-taker. For low-risk test taker security profiles, the system can indicate continued automatic monitoring by the sensors. If the profile indicates the highest-risk situation, the system can transmit a notification to a human proctor who can review the event, intervene if necessary and closely monitor the test taker one-on-one. The system can have multiple monitoring levels available, which can be applied to various levels of test-taker security risk profiles.

The method and non-transitory computer readable medium integrated within the system comprises the steps of confirming that a test taker is authenticated to take a test, creating an initial security risk profile from available data for the test taker, and then assigning a security monitoring level, ranging from minimal and automated monitoring to one-on-one human monitoring. The method and non-transitory computer readable medium integrated within the system comprises further the steps of monitoring actions of the test taker at set intervals or continuously to identify relevant test security occurrences during testing. The method and non-transitory computer readable medium comprises the step of comparing identified security events to a plurality of predetermined individual risk factors, which are used to indicate a (1) risk of test fraud, cheating or theft, by the individual test taker, (2) a location risk factor based on the test location, and (3) an overall individual risk level. The method and non-transitory computer readable medium comprises the step of comparing the individual security risk profile to the threshold risk levels to dynamically assign the security measures to be assigned to the test taker (e.g., computer monitoring, additional forensics analysis, stopping/pausing the test, in person monitoring, etc.). Finally, if the individual's security profile is above or below the current threshold risk level, the method and non-transitory computer readable medium comprises the step of creating, with a software application, a log, and then tracking and storing the information that comprises and is used to determine changes in the security profile. A proctor can review the information generated by the method and non-transitory computer readable medium execute remedial action, as necessary.

The applicant has also developed a system and method that leverages Artificial Intelligence (AI) to create machine-learning models that determine if a test taker's body movements while taking an important test (delivered via the internet) are consistent with how test questions are being responded to and how the test is being navigated. The AI analyzes data feeds from a video camera system against the data feed from the test delivery system, flagging inconsistencies that can be indicative of test fraud, test theft, cheating, or some combination thereof.

BRIEF DESCRIPTION OF THE FIGURES

Additional aspects, features and advantages of the invention, as to its method and system, structure, components, configuration, functionality, and operability will be understood and become more readily apparent when the invention is considered in light of the following description of figures made in conjunction with the accompanying drawings, wherein:

FIG. 6 shows one embodiment of a monitoring log of the system identifying a potential test security issue at the 17 second mark.

DETAILED DESCRIPTION OF THE INVENTION

Figure 1:
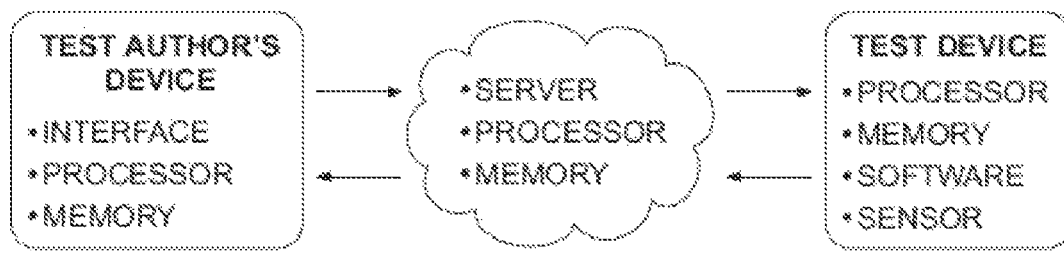
FIG. 1 shows an illustration of the flow of information between components of the system of the invention.
Figure 2:
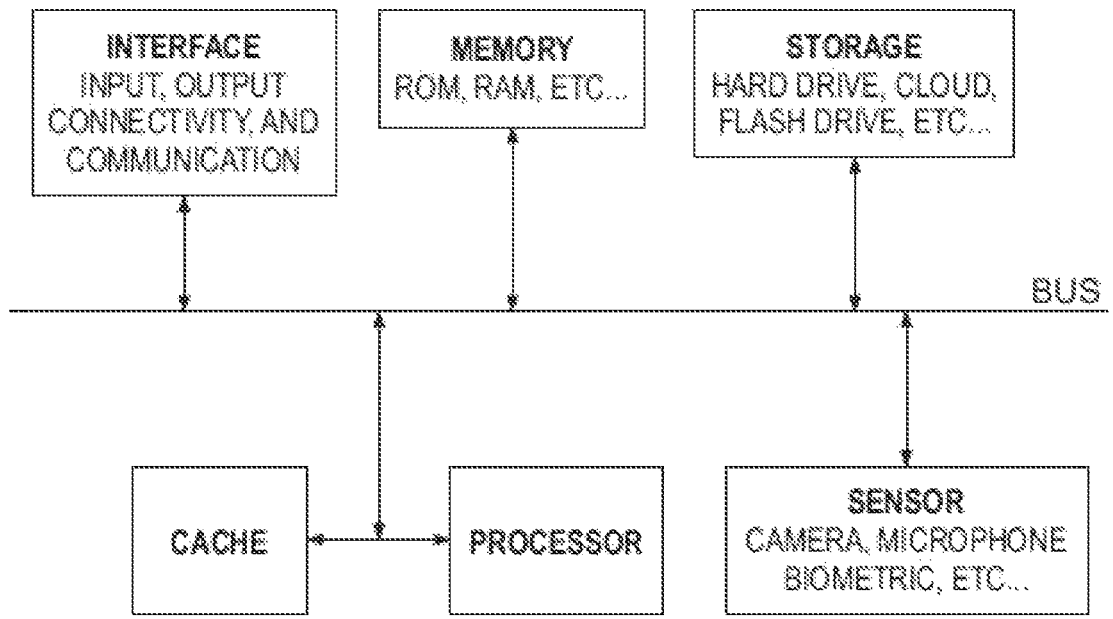
FIG. 2 shows an illustration of the hardware components of the system of the invention.

The invention provides solutions to the present need in the art for systems and methods for dynamically monitoring test taking. The invention solves the prior art problems using a computer-based test platform that is specially programmed to monitor and to catalog all testing events, such as actions or reactions, or the lack of an actions or reactions, taken by a test taker sitting for a particular test at a particular day and time, and at a specific location, and then to determine whether the testing events warrant changes to testing security. The invention can include a computerized test administration system that functions with a test security risk analysis management system in order to allocate security resources intelligently. Various embodiments of the invention are described in detail below.

In an embodiment, the system collects and uses available information to assess risk, prior or ongoing, associated with a test event. The data collection and real-time use of that information for continuous assessment of risk for a test event has never been performed during test administration. Prior art systems collect very little information about a test event before, or even while the test is in progress, and do not use that information to make security decisions (e.g., whether or not to halt the test because of a detected security breach; whether to change the levels of monitoring; etc.).

The invention provides for identifying risk levels for a test event so that security resources can be applied intelligently and dynamically. Human resources are best applied to high-risk events. For example, the detection of a test taker's use of a two-way radio (i.e., a high-risk event) should be allocated greater security resources than a low-risk or no-risk circumstance, such as the test taker stretching or shifting in their seat. Indeed, low-risk events may only be allocated automated security monitoring resources. This dynamic resource allocation is an improvement over current resource management methods, which currently results in using the same resources regardless of whether the security risk is low or high. This type of dynamic resource allocation provided by the invention has not been performed and can significantly reduce the expense of using humans as proctors. In some cases, the costs may be reduced by an estimate of 80% to 90%, due to the reliance on automated monitoring resources for low-risk test events, which generally comprise the majority of risk events. The drastically lower costs of such test administration encourages testing in these areas where the typical fees for testing are significantly high for the market. This embodiment of the invention provides security for high-risk events, more accessibility to testing, and value to areas of the world where testing has been economically hindered.

The invention is also adapted to identify unseen proxies who are taking the test for the test taker while the test taker pretends to take the test. The invention solves the prior art problems by using an AI-enabled, computer vision system specially programmed to sync with an imager, such as a camera, using a software application running on a mobile computer device having a display (e.g., a mobile phone). The camera provides an image (photograph or video) of a real-world test taker and the location of that test taker's hands, which is transmitted via a wired or wireless network, to the software application to: (1) identify the types of inputs that the test taker can physically enter; and (2) notify the proctor if an input is received which the test taker is physically incapable of entering.

To integrate a computer vision component, the software application will first be trained to identify an individual's hands and the extent to which the individual's hands can physically reach inputs. The training takes place using certain feature vectors combined to create two dimensional matrices, which are themselves combined to create 3-dimensional tensors used to automatically build identification model(s) for the individual's hands and the physical limitations of those hands. The system must also be trained to identify the different input devices (e.g., keyboard or mouse) and the extent to which the individual's hands are physically capable of submitting information using these devices (e.g., if the test taker's left pinky is on the "a" key and their right hand is on the mouse are they physically capable of inputting a "p" into the test). System training results in the creation of a plurality of: (1) physical feature vector(s) linked to human hand shape(s) and (2) input feature vector(s) linked to specific input devices. The physical feature vector(s) and the input feature vector(s) are uploaded to a server located either at the site where the test is being administered, or at a site remote from the site where the test is being administered.

With dynamic resource allocation provided by this invention, a test administrator can provide an exam with premium security to a test taker at any location and at any time. This flexibility to take exams anywhere and anytime provides significant benefits for test administrators and test takers. For example, testing can occur in places convenient to test takers, such as homes, community centers, and workplaces. Furthermore, an individual with disabilities that restrict his/her travel could take tests in his/her home where he/she may use his/her own assistive devices.

A detailed discussion of the methods and systems of the invention is provided below. First, a system overview is discussed. Next, a step-by-step approach to dynamic resource allocation of test security is outlined. Third, the system components are identified. A description of a cloud computing system follows. The collection and retention of relevant data is outlined. Finally, incorporation of additional parameters to the system is then delineated.

System Overview

The system is provided for creating and administering a secure, dynamically-monitored test to measure an individual's knowledge or skills, the system comprises:

a software application operating on a mobile computer device or on a computer device, which is synced with at least one sensor for monitoring the individual test taker, the software application is configured to receive information related to the individual test taker from historical databases of the system and at least one sensor and to communicate the information through a wired and/or wireless communication network to a risk analysis management server located at a location remote from the test location, and a processor that is in communication through the wired and/or wireless communication network with the software application, as well as the risk analysis management server, the processor is configured to call up from a database of the system upon communication of the information to the risk analysis management server: (1) a plurality of historical individual risk factors, which may indicate a possibility of test fraud by the individual test taker and have been previously uploaded to the system from a public sources or made available by an owner or author of the test or an employee, contractor, or agent of the owner or author, (2) a non-individual risk factor, such as a location risk factor, or other risk factors not tied to the individual test taker, which has/have been previously uploaded by an owner or author of the test or an employee, contractor, or agent of the owner or author, and (3) threshold risk levels which have been previously determined and uploaded by an owner or author of the test or an employee, contractor, or agent of the owner or author;

whereby the processor is configured to actively monitor the information related to the individual test taker and the test event;

whereby the processor is configured to determine an individual risk profile by adding the information received from the sensor(s) to the test event and individual risk factors to create a modifiable risk profile for the test event;

whereby the processor is configured to determine a security profile for the test taker by combining the individual risk profile and other test event risk factors, including the location risk factor and then to create a security profile to compare to the threshold risk levels; and whereby, when the processor determines that the security profile is different from the initial threshold risk level, within a range of tolerance, the processor is configured to notify the software application.

FIG. 1 illustrates the system that includes a server comprising a processor aided by memory that communicates with sensor(s) and database(s). The database(s) contains: (1) a plurality of historical and current individual risk factors, which indicate a possibility of test fraud by the individual test taker and have been previously determined and uploaded to the database by an owner or author of the test or an employee, contractor, or agent of the owner or author, (2) a test event risk factor, including a location risk factor, which has been previously uploaded to the database by an owner or author of the test or an employee, contractor, or agent of the owner or author, and (3) threshold risk levels which have been previously uploaded to the database by an owner or author of the test or an employee, contractor, or agent of the owner or author.

Creation of Individual Risk Profile

The system receives information related to prior or current testing event(s) from the sensors and communicates such information to the processor when a test taker accesses the system. The sensors can transmit the information at set intervals, when triggers happen, or continuously to the processor related to testing events. The testing event may allow for the sensing of a number of forms such as actions and/or inactions by the test taker, or simply gathering information stored in databases from previous test events. For example, the sensor(s) for a current test event can measure the movement or lack of movement of the eyes of the test taker, whether or not the test taker's breathing or heart rate increases or decreases, or the speed at which the test taker reviews the question or submits an answer. In other embodiments, the sensors can detect involuntary reactions such as biological responses in a current test event. For example, sensors can be used to take a test taker's heart rate, breathing rate, temperature, or level of perspiration. The system can also be used to detect more gross behaviors such as leaving the room where the test is taking place, and returning some time later, both of which could be considered to be an infraction of test taking rules.

The processor can then determine if the information collected by one or more sensor(s) is a match to an individual risk factor within a range of tolerance. In certain embodiments, the individual risk factors can be set at levels that, once exceeded, indicate a likelihood of cheating or other types of test fraud. For example, a test taker's eyes focusing on another test taker's test for more than a tenth (0.1) of a second can indicate a possibility of copying/cheating by the individual test taker. Conversely, the individual risk factors can be the change in certain readings within a certain defined timeframe whose occurrence indicates a likelihood of cheating. For example, an increase of the test taker's heart rate by 20 beats per minute within a thirty second period can indicate a possibility of cheating. In another example, the speed or pattern of answering questions can also indicate cheating with pre-knowledge or harvesting questions.

In the event the processor correlates data within a range of tolerance obtained from sensor(s) with individual risk factors, the system is notified and/or the correlation noted in the individual risk profile. In one embodiment, such relationship can be assigned a numeric value that can be added together to create a dynamic individual risk profile of the test taker or the test event.

The system calculates individual risk profiles based on time passing, correlation with test fraud, data forensics analyses, hardiness of preventative test protections, history of the test taker, trustworthiness of the test site, and many more pertinent data points. The system can use algebraic models to combine these factors and their differential weighting in order to calculate a current individual risk profile. The system can dynamically determine the risk profile as these various risk factors are continuously monitored and evaluated and changes identified.

Incorporation of Non-Individual Risk Factors

The system can be configured to assess other factors not tied to the individual taking the test, while creating a holistic security profile for a test taker. For example, location risk factors can be used. In one embodiment, the location in which the test is administered and/or the timing of the administration can be taken into consideration or used to assign different weights to individual risk factors. By way of example, a test such as the MCAT can be administered in the United States and Australia. Because those locations are on opposite ends of the planet, the individual tests may be administered at different times. With the speed of the Internet, individuals who take the test earlier may be able to steal questions and sell them to those individuals who are taking the test later, thereby compromising test security. In order to combat security breaches in this example, the individual risk factors can be assigned different weights depending on the location where the tests are administered. For example, the system can be configured to place greater weight on individual risk factors related to question theft (e.g., taking unnecessary notes, identification of a photographic lens, etc.) in the location hosting the earlier test. For the location hosting the later test, question theft may not be as great a concern, therefore greater weight can be assigned to individual risk factors related to having prior question knowledge (e.g., not reading the entire question before submitting the answer).

The system can be configured to provide a static value for the location risk factor. For example, more cheating may have previously been observed in the United States than in Australia. Consequently, test takers in the United States can immediately be assigned a higher individual risk profile than the test takers in Australia. Conversely, the location risk factor can be used as a multiplier for identified individual risk factors. Again, if more cheating was observed in the United States than Australia, the United States can be assigned a location risk factor multiple of 2 with Australia assigned a location risk factor multiple of 1. As a result, while wandering eyes can be initially credited as 2 on the individual risk profile, regardless of location, the multiplier in the United States will result in the infraction being recorded as a 4 on the test taker's individual holistic security profile (i.e., 2 for individual risk profile multiplied by 2 from the location risk factor equals 4).

Creation of a Security Profile

The system can be configured to create an individual risk profile from many other risk factors, including the location risk factor to establish a holistic security profile for the individual test taker. The security profile is then compared to predetermined threshold risk levels to dynamically allocate security resources.

Dynamic Security Resource Assignment

The system can be configured to use the individual security profile to intelligently allocate test security resources as needed. Knowing risk levels for a test event allows the system to apply security resources intelligently and differentially in real time. As a result, high-risk events can be allocated greater security resources. Those with low or no risk can only be allocated automated security resources, i.e., fewer and less expensive security resources, but just as effective for the risk level.

Furthermore, as the security profile for each test taker is dynamically evaluated, re-evaluated and adjusted by the system, the system can assign security dynamically with adjustments to compensate for changing levels of risk. For example, a test taker that is originally categorized as low-risk based on his/her initial, pre-testing security profile can engage in a high-risk testing event (e.g., looking at a neighbor's answers for more than a designated period of time). In that case, the system notifies the software application of such an event, the risk analysis management software re-evaluates the individual's security profile, and the system can automatically assign added security resources to that test-taker. Likewise, if the test taker has not engaged in even a low-risk behavior for a period of time, the risk can be re-assessed as lower, and security resources could be re-assigned elsewhere.

Integration of Computer Vision

Proxies taking tests on behalf of others present a vexing threat to test programs. The system and method disclosed herein provide a solution. Specifically, the system and method utilize an AI server leveraging machine-learning models to analyze video and test system data feeds for inconsistencies in real time. This setup offers a powerful solution to meet the threat and minimize the damage to important, global test programs whose test results are used to make crucial decisions on candidate's academic and professional qualifications. Indeed, by integrating video and test system data feeds and comparing them against proven models, test programs can now detect this form of cheating and respond to it appropriately.

Figure 4:
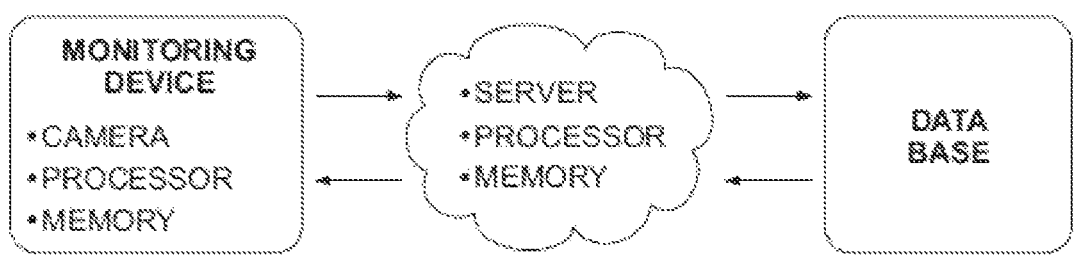
FIG. 4 shows the flow of information between components of the system of the invention.

FIG. 4 shows the system including a server comprising a processor aided by memory that communicates with an image data collection device(s), and database(s). Online-proctoring best practices require one or more web cameras be focused on test takers during the exam. The companies that provide remote proctoring services incorporate cameras that view different body parts of test takers—almost always including the test taker's face and upper torso, and more and more frequently, the hands operating keyboards and a computer mouse.

If a registered test taker has hired a proxy (that is taking the exam on behalf of the other), the test taker might pretend to be taking the test, but his/her typing and mouse movements are false. The proxy is responding to test questions and progressing through the exam, and the registered test taker is merely faking.

The system and method detect this security breach by an automated means of analyzing body movements of the registered test taker against what is being entered into the exam delivery system. Body movements may include those of the head, face, shoulders, arms, torso, and others (depending on camera placements and angles).

For example, the system may analyze hand movements and the use of a computer keyboard and mouse. The machine learning model uses computer vision, whose architecture may be based on the SSD_RESNET50 object detection model. The object detection model is capable of picking out individual features of an image. The object detection is trained to recognize and draw bounding boxes around potential input devices to a computer (keyboard, mouse, track pad) while also detecting hand movements. Hands need to be placed and moved in specific ways in order to manage certain keystrokes and movements. For example, it is difficult for a mouse pointer to move up on a screen if the mouse is moving down on the mouse pad. Similarly, it is difficult for a person typing with one hand to type the word 'apple' quickly with a single hand that does not move laterally on the keyboard.

Figure 5:
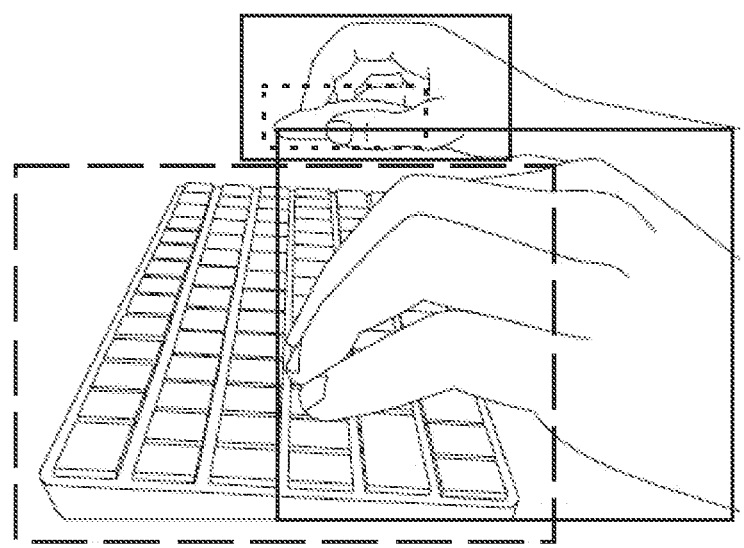
FIG. 5 shows collider bounding boxes drawn around the hands, mouse, and keyboard of a test taker in a testing environment.

FIG. 5 provides an example of bounding boxes used to track a test taker's hands (solid line), keyboard strokes (dashed line); and mouse movements (dotted line). This data should be consistent with what is being entered into the testing system. However, if the AI engine detects an inconsistency, it will flag the instance and alert the remote proctor.

FIG. 6 is a CSV file outlining how the remote proctor may be alerted. In FIG. 6, the first column represents the video data feed, the second column represents timestamps in one second increments, the third column represents what should be input into the test system, and lastly, the fourth column indicates the AI's determination of whether an inconsistency between the two data feeds has occurred. As depicted, test taking behavior appears normal until the $17^{th}$ second, when the video feed indicates that the test system should be receiving keyboard and mouse inputs, but the AI engine recognizes that two handed typing is occurring in the test system. Hence, the AI engine flags the inconsistency for the proctor. At this point, the remote proctor may take any number of appropriate steps based upon a test program's policies for such anomalies, including terminating the exam session.

Once trained, the system is configured to receive a continuous video stream taken by a camera, for example, and to use the image to identify and refer potential security threats to the remote proctor in real time.

As previously described, the system is configured to identify, in a video stream, the presence or absence of a security threat to a test with significant accuracy because it has been previously trained. The training may occur via a serialized machine learning pipeline. The machine learning pipeline is the end-to-end construct which orchestrates the flow of data into, and output from, a machine learning model or set of multiple models.

The process of training any machine learning model involves providing a machine learning algorithm, which is, the learning algorithm, with training data used to construct identification model(s) for identifying potential cheating.

The training process creates and refines the identification model(s). During the training process, the system is provided with scenes of proposed inputs with corresponding hand placements over different inputs devices, along with correct results linked to each scene. The correct results are referred to as a target or a target attribute. The learning algorithm finds patterns in the training data that map the input data attributes to the target. The pattern recognition can be in the form of feature vectors comprised of scalars, which are just single numbers (e.g., reflectivity of a specific physical point). The feature vectors are an array of numbers arranged to identify each individual number by its index in that ordering (e.g., points in space with each element giving a coordinate along a different axis). The feature vectors are combined to form matrices, which are a 2-dimensional array of numbers so each element is identified by two indices instead of just one (e.g., the reflectivity of a screwdriver at coordinates along an axis). Matrices are combined to create tensor(s) which are an array of numbers arranged on a regular grid with a variable number of axes. Feature vectors can be revised by adding additional scalars, matrices can be revised by adding additional feature vectors, and tensors can be revised by adding additional matrices if each have the same shape. Such revisions can be accomplished by the system automatically adding corresponding elements while training. As the system trains, it automatically amends the relevant tensor(s) in a manner that best captures the patterns (i.e., provides the highest precision). The training continues with the updated learning algorithm being exposed to new scenes without the aid of knowing the target or target attributes.

Both an anatomical module (i.e., a module that identifies parts of the human anatomy and the physical limitations of how that anatomy can bend) and a input module (i.e., a module that identifies the input devices in a video stream) are trained. Such training may occur in series or in parallel. Such training may be automatic. In addition, such training may be supervised machine learning and deep learning in that an administrator of the system or an employee, contractor, or agent of the administrator evaluates the results and approves changes to the learning algorithm. As previously discussed, supervised learning involves using an algorithm modeled to an input example to identify target classification (s) (e.g., what inputs can a proposed hand position actually reach) or numeric value(s) (e.g., how many buttons can the hand push at once and in what order). In certain embodiments, the target classification and numeric values are linked (e.g., can the hand physically push one button under the palm without pushing any other buttons).

Once the models have been trained with expected performance, the next step is to assess the prediction results of the models in a controlled, close-to-real setting to gain confidence that the models are valid, reliable, and meets business requirements for use. In this step, confidence thresholds of the modules are set (i.e., the module that identifies cheating is occurring in a video). In identifying whether cheating is occurring in real world videos, the system assigns a numeric confidence value to each output. This confidence value represents the system's confidence in the prediction. The system determines a correctness of each prediction in the set of predictions and determines a relationship between the confidence scores and the correctness of the test predictions. The system establishes a confidence threshold for the models. To avoid incorrect designations, the administrator of the system or an employee, contractor, or agent of the administrator designates a minimum confidence threshold. Minimum thresholds can be universal across all items such as a system will only identify a security issue if the system identifies the security issue with more than 90% confidence. Conversely, unique confidence threshold(s) can be linked to individual item(s). For example, the system can be configured to identify a security threat based on keyboard inputs with 70% confidence but may be restricted from confirming security threat from a mouse input unless the confidence value for that identification is greater than 95%.

Once evaluation of the models are complete, the models are ready for deployment into a production system. In certain embodiments, the production system is deployed as a Web service on a server, which can be called by other components in a target production system such as a network edge device, to get predictive results for what security threat may be located within an image (photograph or video). In some embodiments, the production system will be reimplemented in a programming language that is different from the programming language used to train the system. For example, the system may be trained using Python but implemented in Java.

Step-by-Step Approach

This section describes a non-limiting, exemplary embodiment that includes the steps of the process of the invention.

Step 1. When a test event is scheduled, the system calls up all prior testing events that occurred at the testing location or at other locations. Furthermore, as individual test takers register for the test, the system calls up all prior testing events that each test taker was part of. The system checks to see if external risks are current, e.g., the test has been disclosed on the Internet or cheating has been discovered on that test with a cluster of other test takers. The system then provides an initial starting risk level for that test event. The scheduling process can also include such information as test start time and other test-related information and the payment of fees.

Step 2. The system analyzes all available data using a multivariate statistical model and assigns a risk factor(s) based on prior testing events which may have occurred at the testing location and initial individual risk factors based on prior testing events which each test taker may have been part of.

Step 3. Based on the non-individual risk factor and initial individual risk factors, the system assigns security resources to the event. The resources can include a stricter authentication step, a combination of human monitoring in differing degrees, and additional advanced technology monitoring. For the highest risk level, maximum security resources can be applied during the entire testing session. For lower risk levels, fewer security resources are applied. In some embodiments, resources will not be required for lower risk levels including no risk and human security. Sophisticated automated monitoring, because it is inexpensive, would remain as the default security level for the minimum risk levels.

Step 4. The system maintains logs of data collected and decisions made at all steps of the risk analysis and management process for later review, in an applicant file or a test file or a system file. The collected data can include, but not be limited to, records of the behaviors of test takers such as responses and latencies answering test questions, audio and video behavior, communications with the system/proctors, calculations of risk by the system, scores, appeals, or assignment of proctor and security resources. The logs can be used for research, to respond to a challenge against any decisions, or for the tuning of the adjustment process of future risk factors in the future.

Step 5. When the test concludes, the system can provide an evaluation of the security applied to each test score. This step may provide evidence that the test score was produced without interference from security threats, that the test score can be trusted from at least that security perspective. The system can then provide a link for the test taker or other user of the test score (university admissions officer, teacher, parent, employer, etc.) so that the score can be accessed and independently used, if necessary.

Computer Vision Interaction with Users

Although the disclosed system may proceed automatically, individual(s) and/or team(s) can interact with test takers. For example, in one embodiment, a user can audit or change the system's identification of security threats with such information being transmitted back to the administrator of the system or an employee, contractor, or agent of the administrator for incorporation into additional system training. This section describes non-limiting, exemplary embodiments of such interactions in which a user may review, approve, or change any aspect of the security protocol identified by the system.

User Login

The first step of the software application is for the user to log in. In one embodiment, the system provides for multi-role support. For example, the user can be a test taker or a representative of the company that administers the test.

The user begins by visiting a website or loading a computer application. A server determines if this is the first visit by the user. If the server determines this is a subsequent visit, prior general information (e.g., name, contact information, access authorization, etc.) is loaded. If this is the first visit by the user, the same general information is collected. Once the user is identified, they are permitted to sign into the application. Upon signing in, the user arrives at the landing page. In one non-limiting embodiment, the landing page is dynamic and can display different information depending on the role of the user (i.e., a test taker would be presented with the different landing page than a proctor, who would themselves see a different page from an testing administrator).

Equipment Calibration

In one embodiment, the ability to calibrate the view of the imager/camera depends on the role of the user. For example, if the user is a test taker they may not be permitted to adjust the camera. Conversely, a testing administrator may be permitted to remotely adjust the camera not only view the test taker, but also the testing environment. Furthermore, certain users (e.g., proctors), can be restricted to see only the test taker with the view behind the test taker obscured for privacy purposes.

In another embodiment, the system can further include an option to audit the test results. In such an embodiment, a user, such as a testing administrator, can first view the test results. The user can then view whether there were any anomalous inputs occurred during the test. In this regard, the user can identify potential security flaws.

System Components

A non-limiting embodiment of the system includes a general-purpose computing device, including a processing unit (CPU or processor), and a system bus that couples various system components including the system memory such as read only memory (ROM) and random access memory (RAM) to the processor. The system can include a storage device connected to the processor by the system bus. The system can include interfaces connected to the processor by the system bus. The system can include a cache of high-speed memory connected directly with, in close proximity to, or integrated as part of the processor. The system can copy data from the memory and/or a storage device to the cache for quick access by the processor. In this way, the cache provides a performance boost that avoids processor delays while waiting for data. These and other modules stored in the memory, storage device or cache can control or be configured to control the processor to perform various actions. Other system memory can be available for use as well. The memory can include multiple different types of memory with different performance characteristics.

Computer Processor

The invention can operate on a computing device with more than one processor or on a group or cluster of computing devices networked together to provide greater processing capability. The processor can include any general purpose processor and a hardware module or software module, stored in an external or internal storage device, configured to control the processor, as well as a special-purpose processor where software instructions are incorporated into the actual processor design. The processor can essentially be a completely self-contained computing system, containing multiple cores or processors, a bus, memory controller, cache, etc. A multi-core processor can be symmetric or asymmetric.

For clarity purposes, an illustrative embodiment of the system is shown as including individual functional blocks including certain functional blocks labeled as a "processor". The functions the blocks represent can be provided through the use of either shared or dedicated hardware, including, but not limited to, hardware capable of executing software and hardware, such as a processor that is purpose-built to operate as an equivalent to software executing on a general purpose processor. For example, the functions of one or more processors can be provided by a single shared processor or multiple processors. The use of the term "processor" should not be construed to refer exclusively to hardware capable of executing software. Illustrative embodiments may include microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, can also be provided.

System Bus

The system bus can be any of several types of bus structures including a memory bus or memory controller, a peripheral bus, and a local bus using any of a variety of bus architectures. A basic input/output (BIOS) stored in ROM or the like, can provide the basic routine that helps to transfer information between elements within the computing device, such as during start-up.

Storage Device

The computing device can also include a storage device such as a hard disk drive, a magnetic disk drive, an optical disk drive, a solid state drive, a tape drive or the like. Similar to the system memory, a storage device can be used to store data files, such as location information, menus, software, wired and wireless connection information (e.g., information that enables the mobile device to establish a wired or wireless connection, such as a USB, Bluetooth or wireless network connection), and any other suitable data. Specifically, the storage device and/or the system memory can store code and/or data for carrying out the disclosed techniques among other data.

In one aspect, a hardware module that performs a particular function includes the software component stored in a non-transitory computer-readable medium in connection with the necessary hardware components, such as the processor, bus, display, and so forth, to carry out the function. The basic components are known to those of skill in the art and appropriate variations are contemplated depending on the type of device, such as whether the device is a small, handheld computing device, a desktop computer, or a computer server.

Although the preferred embodiment described herein employs cloud computing and cloud storage, other types of computer readable media that can store data and that are accessible by a computer, such as magnetic cassettes, flash memory cards, digital versatile disks, cartridges, random access memories (RAMS), read only memory (ROM), a cable or wireless signal containing a bit stream and the like, can also be used in the operating environment. Furthermore, non-transitory computer-readable storage media as used herein can include all computer-readable media, with the sole exception being a transitory propagating signal per se.

Interface

To enable user interaction with the computing device, an input device represents any number of input mechanisms, such as a microphone for speech, a web camera for video, a touch-sensitive screen for gesture or graphical input, keyboard, mouse, motion input, speech and so forth. An output device can also be one or more of a number of output mechanisms, such as, a display screen, speaker, alarm, and so forth. In some instances, multimodal systems enable a user to provide multiple types of input to communicate with the computing device. The communications interface generally governs and manages the user input and system output. Furthermore, one interface, such as a touch screen, can act as an input, output and/or communication interface.

There is no restriction on operating on any particular hardware arrangement. Here, the basic features can be easily substituted for improved hardware or firmware arrangements as they are developed.

Sensors

The system includes at least one sensor for monitoring the test taker. The sensor can take many forms. For example, the sensor can be an auditory sensor (e.g., microphone), a video sensor (e.g., camera), a biometric sensor (e.g., pulse detector, keyboard patterns, voiceprint, facial recognition), a motion detector, a proximity sensor, or a combination thereof (e.g., a camera which is configured to also measure the temperature of the test taker). In one non-limiting embodiment, the proximity sensor can be configured to monitor and confirm that the test taker remains in a dictated location or within a range of the testing location. In another embodiment, the sensor can be a motion sensor configured to monitor the test taker's eyes. The sensor can also monitor less obvious behaviors, such as response patterns answering questions that reveal the use of pre-knowledge, for example.

In one non-limiting embodiment, the sensor can be mounted on a wearable device, such as a headset or glasses. The wearable device can, again, include biometric sensors, such as a pulse detection sensor, eye direction sensors, a three-axis accelerometer, a GPS module, an RF sensor, an RFID or NFC chip, a galvanic skin response sensor, or other sensor to detect stress or continued presence or proximity to the testing location. Such a wearable sensor can be configured to alarm or vibrate if the sensor is moved out of a proximity to the testing location, within a range of tolerance. The wearable sensor can also record the field of view which is seen by the eyes of the test taker. Such a configuration can capture information about any visual aids viewed or utilized by the test taker. In order to assure that the sensor is properly worn, a second visual sensor, such as a camera can be used to monitor the test taker for the presence and proper use of the sensor.

In one embodiment, the sensor includes electronic components for wired or wireless communication with the system. As a result, the sensor can avoid interference with the administration of the test. In one embodiment, the sensor is replaceable or added to, such that different sensors can be removed, which can allow the sensor to be cleaned.

In another embodiment, the sensor can include embedded monitoring components that are configured to verify the identity of the user and monitor the remote session environment for a duration of an entire session. For example, the sensor can employ facial recognition software or finger print analysis to confirm the identity of the test taker at set intervals or continuously.

In another embodiment, a sensor detects the security design features of the test. A test that prevents the theft of the questions or different methods of cheating would provide critical information for the assessment of risk by the risk analysis and management system.

The system can include more than one sensor. Indeed, the system can include 2, 3, 4, 5, 6, 7, 8, 9, or 10 sensors, each of a different type and different purpose. For example, the system may include two cameras, a microphone, a biometric sensor and a statistical response pattern sensor. In one embodiment, the sensors cannot be easily tampered with.

Software Operations

The logical operations of the various embodiments disclosed are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system can practice all or part of the recited methods, can be a part of the recited systems, and/or can operate according to instructions in the recited non-transitory computer-readable storage media. Such logical operations can be implemented as modules configured to control the processor to perform particular functions according to the programming of the module. For example, if a storage device contains modules configured to control the processor. These modules can be loaded into RAM or memory at runtime or can be stored as would be known in the art in other computer-readable memory locations. Having disclosed some components of a computing system, the disclosure now turns to a description of cloud computing, which is the preferred environment of the invention.

Cloud System

Cloud computing is a type of Internet-based computing in which a variety of resources are hosted and/or controlled by an entity and made available by the entity to authorized users via the Internet. A cloud computing system can be configured, wherein a variety of electronic devices can communicate via a network for purposes of exchanging content and other data. The system can be configured for use on a wide variety of network configurations that facilitate the intercommunication of electronic devices. For example, each of the components of a cloud computing system can be implemented in a localized or distributed fashion in a network.

Cloud Resources

The cloud computing system can be configured to include cloud computing resources (i.e., "the cloud"). The cloud resources can include a variety of hardware and/or software resources, such as cloud servers, cloud databases, cloud storage, cloud networks, cloud applications, cloud platforms, and/or any other cloud-based resources. In some cases, the cloud resources are distributed. For example, cloud storage can include multiple storage devices. In some cases, cloud resources can be distributed across multiple cloud computing systems and/or individual network enabled computing devices. For example, cloud computing resources can communicate with a server, a database, and/or any other network enabled computing device to provide the cloud resources.

In some cases, the cloud resources can be redundant. For example, if cloud computing resources are configured to provide data backup services, multiple copies of the data can be stored such that the data is still available to the user even if a storage resource is offline, busy, or otherwise unavailable to process a request. In another example, if a cloud computing resource is configured to provide software, the software can be available from different cloud servers so that the software can be served from any of the different cloud servers. Algorithms can be applied such that the closest server or the server with the lowest current load is selected to process a given request.

User Terminal

A user interacts with cloud computing resources through user terminals or testing devices connected to a network by direct and/or indirect communication. Cloud computing resources can support connections from a variety of different electronic devices, such as servers, desktop computers, mobile computers, handheld communications devices (e.g., mobile phones, smart phones, tablets), set top boxes, network-enabled hard drives, and/or any other network-enabled computing devices. Furthermore, cloud computing resources can concurrently accept connections from and interact with multiple electronic devices. Interaction with the multiple electronic devices can be prioritized or occur simultaneously.

Cloud computing resources can provide cloud resources through a variety of deployment models, such as public, private, community, hybrid, and/or any other cloud deployment models. In some cases, cloud computing resources can support multiple deployment models. For example, cloud computing resources can provide one set of resources through a public deployment model and another set of resources through a private deployment model.

In some configurations, a user terminal can access cloud computing resources from any location where an Internet connection is available. However, in other cases, cloud computing resources can be configured to restrict access to certain resources such that a resource can only be accessed from certain locations. For example, if a cloud computing resource is configured to provide a resource using a private deployment model, then a cloud computing resource can restrict access to the resource, such as by requiring that a user terminal access the resource from behind a firewall.

Service Models

Cloud computing resources can provide cloud resources to user terminals through a variety of service models, such as Software as a Service (SaaS), Platforms as a service (PaaS), Infrastructure as a Service (IaaS), and/or any other cloud service models. In some cases, cloud computing resources can provide multiple service models to a user terminal. For example, cloud computing resources can provide both SaaS and IaaS to a user terminal. In some cases, cloud computing resources can provide different service models to different user terminals. For example, cloud computing resources can provide SaaS to one user terminal and PaaS to another user terminal.

User Interaction

In some cases, cloud computing resources can maintain an account database. The account database can store profile information for registered users. The profile information can include resource access rights, such as software the user is permitted to use, maximum storage space, etc. The profile information can also include usage information, such as computing resources consumed, data storage location, security settings, personal configuration settings, etc. In some cases, the account database can reside on a database or server remote to cloud computing resources such as servers or database.

Cloud computing resources can provide a variety of functionality that requires user interaction. Accordingly, a user interface (UI) can be provided for communicating with cloud computing resources and/or performing tasks associated with the cloud resources. The UI can be accessed via an end user terminal in communication with cloud computing resources. The UI can be configured to operate in a variety of client modes, including a fat client mode, a thin client mode, or a hybrid client mode, depending on the storage and processing capabilities of cloud computing resources and/or the user terminal. Therefore, a UI can be implemented as a standalone application operating at the user terminal in some embodiments. In other embodiments, a web browser-based portal can be used to provide the UI. Any other configuration to access cloud computing resources can also be used in the various embodiments.

Collection of Data

In some configurations, during the testing described above, a storage device or resource can be used to store relevant data transmitted from the sensor(s) or the test taker's device to a database over a wired or wireless communication network. For example, how long it takes to read and process the question or the number of identified incidents of cheating may be captured. Such data collection may permit the system to engage in additional machine learning. Such learning will permit more efficient issue identification in the future. Such data/learning may be used to dynamically adjust risk factors or the calculations based on those risk factors.

The data stored can also be incorporated into the disclosed system and methods to refine the testing experience or evaluate security. For example, if a location experiences an increase in cheating incidents in the first part of the test, the location risk factor can be increased during the test which can result in the allocation of additional security resources with relation to all the test takers at that site. As a result, the information collected can serve more than one purpose (quality of measurement, better security, more fairness, and others). Those purposes can also be routinely evaluated.

In another embodiment, the image data collection device(s) may capture specific tendencies of the individual(s) taking the test. The system may utilize such information to immediately or in the future suggests adjustments to the position of the monitoring device and/or additional needed equipment. Indeed, the system may be a dynamic system that through use learns the preferences and tendencies of the individual(s) taking the test. By learning such preferences and/or tendencies the system may increase the efficiencies and/or lower the intrusiveness of the monitoring. For example, the system may recognize blind spots in certain angles of view and recommend different angles of view be used.

The system also contemplates that this gathered data might include personal and/or sensitive data in some instances. The system further contemplates that the entities responsible for the collection, analysis, disclosure, transfer, storage, or other use of such data should implement and consistently use privacy policies and practices that are generally recognized as meeting or exceeding industry or governmental requirements for maintaining personal information data private and secure. For example, user data should be collected only for legitimate and reasonable uses of the entity and not shared or sold outside of those legitimate uses. Further, such collection should occur only after the informed consent of the subjects. Additionally, such entities should take any needed steps for safeguarding and securing access to such personal data and ensuring that others with access to the personal data adhere to their privacy and security policies and procedures. Further, such entities can subject themselves to evaluation by third parties to certify their adherence to widely accepted privacy policies and practices.

Incorporation of Additional Parameters

Identity Verification

In a non-limiting embodiment, the sensors can be used to authenticate the test taker before the administration of the test. In one example, the system can be linked to a public or private database that includes photo or biometric information of the test taker (e.g., finger prints). Before the test can be presented to the test taker, the system can be required to authenticate the right of the test taker to take the test. Such verification and confirmation can be accomplished in many ways, for example, the use of facial recognition, keystroke pattern analysis, voice recognition software or fingerprint scanners, or many others, which can be hardware or non-hardware dependent.

Corrective Actions

In a non-limiting embodiment, when the security profile exceeds a threshold risk level, the entire system can be alerted. The system can then allow a proctor monitoring the system and assigned to the test event to: (1) review the security profile and/or the testing events identified in the security profile; and/or (2) pause the test to discuss the issues with the test taker, and (3) other reasonable actions given the circumstances. Such review and/or communication can occur in person or remotely (i.e., the proctor remoting into the device on which the test being administered or calling the person on a phone). To the extent a security breach is identified, the proctor can seize control of the testing session. For example, if a threat is detected, the proctor can pause the test and deal with the test taker via a live or remote chat session. When a test is paused, the current test item can be "covered" and the test timing can be suspended. If the problem is resolved to the satisfaction of the proctor, he or she can "un-pause" the test allowing it to continue as if nothing had happened. If the problem cannot be resolved, the proctor has the options of (1) suspending the test, which allows it to continue at another scheduled time, or (2) cancelling the test event altogether. Such control provides a very effective tool in the hands of the proctor to motivate compliance or to address the risk directly, one that is missing in the offerings of many online and some on-site proctoring service vendors today.

EXAMPLE

Figure 3:
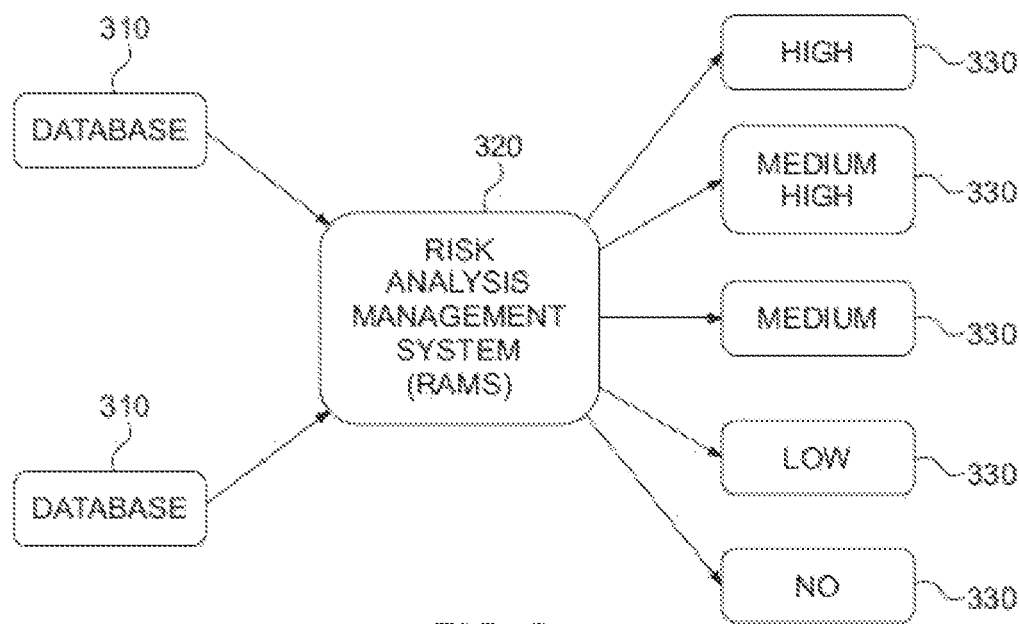
FIG. 3 shows a flow chart of an embodiment of the functionality of the invention.

FIG. 3 shows an exemplary embodiment of the disclosed system. At least one database 310 feeds information to a processors 320, which may also be referred to as a Risk Analysis Management System (RAMS). The information may be fed at set intervals or continuously.

In certain embodiments there are two or more databases 310. Such databases can be segregated based on the type of information stored. For example, one database can hold information uploaded before a testing event, such as: (1) prior incidents at the testing center, (2) test designs (e.g., multiple choice tests versus short answer or essay tests), (3) location of the testing event, (4) web monitoring reports (e.g., review of social media chatter prior to the test to see if potential cheating is being discussed), (5) data forensic reports, (6) system security, (7) examinee history, and (8) ability to authenticate examinee. Conversely, another database may include information obtained during the testing event, such as: (1) test taker movement, (2) audio of the test taking environment, (3) real-time biometrics of the test taker, (4) proctor location, actions, and the test takers response thereto, (5) unauthorized communications by the test taker, and (6) the test taker's adherence to the rules of the testing environment. The RAMS 320 takes the information from the database(s) 310, combines the information and statistically determines the level of risk associated with a test event. The risk is then assigned a classification 330.

In one embodiment, the classifications 330 are broken down as: (1) No Risk, (2) Low Risk, (3) Medium Risk, (4) Medium High Risk and (5) High Risk. Increased security measures are assigned to higher risk events. The classifications 330 are not static. Indeed, additional information may change the risk level dynamically. For example, an incident occurring in real-time during testing may elevate a risk level from Low Risk to High Risk almost instantaneously.

While this subject matter has been disclosed with reference to specific embodiments, it is apparent that other embodiments and variations can be devised by others skilled in the art without departing from the true spirit and scope of the subject matter described herein. The appended claims include all such embodiments and equivalent variations.

What is claimed is:

1. A system for monitoring an individual test taker and verifying compliance with rules of behavior with regard to a test event by a proctor, during a test session administered to an individual at a test location on a mobile computer device or a computer device, the system comprising:

a software application operating on the mobile computer device or on the computer device, which are synched with at least one camera on the computer devices that continuously captures images of the test taker and is linked to a computer vision-driven artificial intelligence network, the software application configured to receive information related to the individual test taker from the camera and to communicate the information through a wired and/or wireless communication network to a risk analysis management server located at the test location or at a location remote from the test location, and a processor that is in communication through the wired and/or wireless communication network with the software application, as well as the computer vision-driven artificial intelligence network and risk analysis management server, the processer is configured to call up from a database of the system upon communication of the information to the risk analysis management server: (1) a plurality of predetermined individual risk factors, which indicate a possibility of test fraud, cheating, or test theft, by the individual test taker or others at the location, the predetermined individual risk factors having been previously uploaded by either the computer vision-driven artificial intelligence network or an owner or author of the test or an employee, contractor, or agent of the owner or author, (2) a non-individual risk factor, which has been previously uploaded by either the computer vision-driven artificial intelligence network or the owner or author of the test or an employee, contractor, or agent of the owner or author, and (3) a set of threshold risk levels which have been previously uploaded by either the computer vision-driven artificial intelligence network or the owner or author of the test or an employee, contractor, or agent of the owner or author;

whereby the processor is configured to actively monitor the information related to the test event, including the continuous images from the camera;

whereby the processor is configured to combine the information received from the camera in real time during the testing event with the predetermined individual risk factors to determine an updated value of the individual risk profile and update the individual risk profile value based on the number of threshold risk levels the updated individual risk profile exceeds;

whereby the processor is configured to determine a security profile for the test taker by combining the updated value of the individual risk profile and the non-individual risk factor to create the security profile, and compare that security profile to the set threshold risk level;

whereby when the processor determines that the security profile is above the set threshold risk levels, within a range of tolerance, the processor is configured to notify the software application; and whereby the software application notifies the proctor that the test taker has exceeded the threshold risk level and grants the proctor access to the computer devices, including the camera.

2. The system of claim 1 wherein, based on active monitoring of the test event by the camera, the system is configured to dynamically increase or decrease the allocation of security resources based on how many threshold risk levels the currently calculated security profile is above.

3. The system of claim 2 wherein, based on active monitoring of the test event by the camera, the system is configured to increase the allocation of security resources when the security profile traverses the threshold risk level, within a range of tolerance, from below an individual threshold risk level to above the individual threshold risk level.

4. The system of claim 2 wherein, based on active monitoring of the test event by the camera, the system is configured to decrease the allocation of security resources when the security profile traverses the threshold risk level, within a range of tolerance, from above an individual threshold risk level to below the individual threshold risk level.

5. The system of claim 1 wherein, the non-individual risk factor is a location risk factor.

6. The system of claim 1 wherein, the cameras measure the movement of the individual test taker.

7. A system for monitoring an individual test taker and verifying compliance with rules of behavior with regard to a test event administered at a test location by a proctor during a test session, the system comprising:
- a software application operating on a website accessible through a wired or wireless communications network by a unique mobile computer device or a unique computer device which are synced with at least one camera connected to the computer devices that continuously captures images of the test taker and is linked to a computer vision-driven artificial intelligence network, the software application configured to receive information related to the individual test taker and testing location from the continuous images from the camera and to communicate the information through a wired and/or wireless communication network to a risk analysis management server located at the test location or at a location remote from the test location; and
- a processor that is in communication through the wired and/or wireless communication network with the software application, as well as the computer vision-driven artificial intelligence network and the risk analysis management server, the processer is configured to call up from a database of the system upon communication of the information to the risk analysis management server: (1) a plurality of predetermined individual risk factors, which indicate a possibility of test fraud, cheating or test theft, by the individual test taker or others at the location, the predetermined individual risk factors having been previously uploaded by the computer vision-driven artificial intelligence network or an owner or author of the test or an employee, contractor, or agent of the owner or author, (2) a plurality of non-individual risk factors, which have been previously uploaded by the computer vision-driven artificial intelligence network or the owner or author of the test or an employee, contractor, or agent of the owner or author, and (3) a set of threshold risk levels which have been previously uploaded by the computer vision-driven artificial intelligence network or the owner or author of the test or an employee, contractor, or agent of the owner or author;
- whereby the processor is configured to actively monitor the information related to the test event, including the continuous images from the camera;
- whereby the processor is configured to combine the information received from the camera in real time during the testing event with the predetermined individual risk factors to determine an updated value of the individual risk profile and update the individual risk profile value based on the number of threshold risk levels the updated individual risk profile exceeds;
- whereby the processor is configured to determine a security profile for the test event by combining the value of the individual risk profile and the non-individual risk factors to create the security profile and compare that security profile to the set threshold risk level;
- whereby when the processor determines that the security profile is above or below the set threshold risk levels, within a range of tolerance, the processor is configured to notify the software application; and
- whereby the software application notifies the proctor that the test taker has exceeded the threshold risk level and grants the proctor access to the computer devices.

8. The system of claim 7 wherein, based on active monitoring of the test event by the camera, the system is configured to dynamically increase or decrease the allocation of security resources based on whether the security profile is above or below the threshold risk level.

9. The system of claim 7 wherein, based on active monitoring of the test event by the camera, the system is configured to increase the allocation of security resources when the security profile traverses the threshold risk level, within a range of tolerance, from below the threshold risk level to above the threshold risk level.

10. The system of claim 8 wherein, based on active monitoring of the test event by the camera, the system is configured to decrease the allocation of security resources when the security profile traverses the threshold risk level, within a range of tolerance, from above the threshold risk level to below the threshold risk level.

11. The system of claim 7 wherein, the non-individual risk factor is a location risk factor.

12. The system of claim 7 wherein, the camera measures the movement of the individual test taker.

13. A method for monitoring an individual test taker and verifying compliance with rules of behavior with regard to a test event, the method comprising:
- receiving information related to the individual test taker from: a camera that provides continuous images of the individual test taker, the camera synced through a wired and/or wireless communication network with a computer vision-driven artificial intelligence network and a software application operating on a mobile computer device or on a computer device;
- upon receiving the information, using a processor to verify the identity of the individual test taker and call up: (1) a plurality of predetermined individual risk factors, which indicate a possibility of cheating or test theft by the individual test taker, (2) non-individual risk factors, and (3) a set of threshold risk levels;
- creating an individual risk profile by comparing the information received from the camera, including the continuous images from the camera, against the individual risk factors and non-individual risk factors;
- combining the individual risk profile with the non-individual risk factors, creating a security profile for the test event;
- comparing the security profile of the test event to the threshold risk levels;
- notifying the software application if the security risk profile is above or below a specified threshold risk level; and
- assigning additional security resources when the security profile is above the specified threshold risk level.

14. The method of claim 13 further comprising:
- dynamically increasing or decreasing the allocation of security resources based on active monitoring of the test event by the camera.

15. The method of claim 14, wherein, increased security resources are allocated if the security profile crosses the specified threshold risk level, within a range of tolerance, from below the specified threshold risk level to above the specified threshold risk level.

16. The method of claim 14, wherein, decreased security resources are allocated if the security profile crosses the specified threshold risk level, within a range of tolerance, from above the specified threshold risk level to below the specified threshold risk level.

17. The method of claim 13, wherein, the non-individual risk factor is a location risk factor.

\* \* \* \* \*